Feb. 10, 1959  J. W. GREENWOOD  2,872,731
BEARING-SUPPORTED ROUTER
Filed Feb. 3, 1955
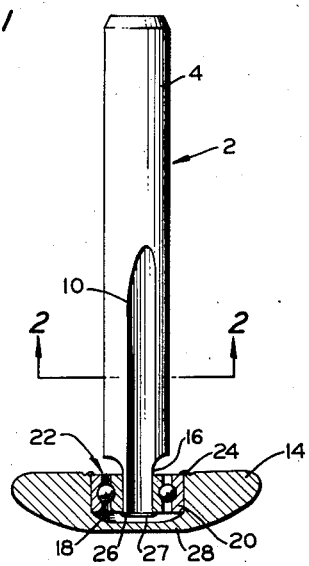
FIG_1
FIG_2
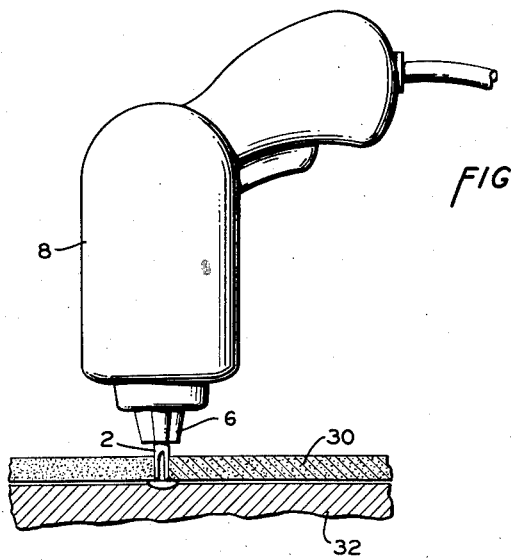
FIG_3
INVENTOR.
JOHN W. GREENWOOD
BY
ATTORNEY United States Patent Office 2,872,731
Patented Feb. 10, 1959

2,872,731
BEARING-SUPPORTED ROUTER
John W. Greenwood, Oakland, Calif.
Application February 3, 1955, Serial No. 485,905
1 Claim. (Cl. 30—276)

This invention relates to power-driven routers and, more particularly, to a bearing-supported router, especially useful for cutting plaster casts.

While the present invention is capable of being used in general for cutting various materials in various situations, it is especially useful where one layer of material adjacent another is to be cut without cutting the other material, such as, for example, plaster casts from inanimate objects; and it is particularly appropriate for cutting plaster casts from living human and animal patients, especially where the cut is desired to be curved along a relatively short radius, and where the cut must be taken in a region allowing relatively little room for the cutting tool. Prior art power-driven cast cutters were usually in the form of a circular saw which is either rotated or oscillated to provide cutting action. These cast cutters suffered from the deficiency of providing insufficient protection for the skin of the patient since there usually was nothing to prevent contact of the saw was the patient's limb except the operator's judgement of the thickness of the plaster cast. Furthermore, cast cutters of the circular saw type usually could not be operated along a sharply curved path because of the diameter of the saw and the size of the related equipment. Also, they suffered from the defect of scaring the patient by the apparent danger of being cut.

The present invention overcomes these defects of the prior art devices by providing a cutting tool in the form of a router which cuts in the direction in which the cast extends rather than cutting, as does a saw, in a direction perpendicular to the direction in which the cast extends. To protect the body of the patient and to facilitate stably supporting the tool during cutting and moving it easily along a sharply curved path, there is provided a safety plate in which the free end of the router bears and which supports the router and at the same time prevents the router from touching the body of the patient. The primary object of the present invention is to provide a power-driven cutter which, being of general utility, will adequately cut plaster casts, cannot injure the patient, and which will not frighten the patient by appearing dangerous.

Other objects and many of the attendant advantages of this invention will be readily appreciated as the same becomes better understood by reference to the following detailed description when considered in connection with the accompanying drawings wherein:

Fig. 1 is an elevation view of the cutter of this invention, partly in cross-section, somewhat enlarged;

Fig. 2 is a cross-section of the cutter taken along the line 2—2 in Fig. 1;

Fig. 3 is an elevation view, partly in cross-section, showing the cutter of the present invention mounted in a power tool in position for cutting a plaster cast.

While, as previously mentioned, the cutter is useful for cutting various types of materials, the following description, chosen for illustration only, describes the cutter as being used for cutting a plaster cast, for which purpose it is particularly suited.

Reference is made to the drawings where numeral 2 indicates the cutter, generally, having a shank portion 4 adapted to be fixed, as by a chuck 6, to a power-driving means such as a portable drill or grinder 8, conveniently driven by either electricity or compressed air. The cutting region 10 of the cutter is made up of one or more cutting sections 12.

A safety plate 14 is fixed in bearing relation to the free end 16 of the cutter 2. This is conveniently accomplished by forming a recess 18 in the plate 14 and fixing the outer race 20 of a ball bearing 22 to the plate in the recess as by swaging over the edge 24 of the recess 18. This can be done easily if relatively malleable material such as aluminum is used to make the plate 14. The tip 26 of the free end of the cutter 2 is force fit or otherwise fixedly attached to the inner race of the bearing 22. Preferably the free end of the tip is swaged over the inner race as at 27 to prevent the bearing from coming off of the cutter. The plate 14 performs several functions. Since the portion 28 of the plate 14 lies outward in the axial direction of the router 2 beyond the free end 16 thereof, the router is prevented from contact with a surface, such as a human limb, on which the portion 28 of the plate may rest. This is particularly obvious where, as in the preferred illustrated embodiment, the free end of the router is spanned or covered over by the material of the plate 14 which forms the bottom of the recess 18; but it would also be true even in the case where the recess 18 was extended completely through plate 14 in the form of a hole, as long as the tip 26 did not project beyond the lowermost material of the plate 14 as viewed in Fig. 1. The plate 14 also serves as a support for the router 2 keeping the router steady, preventing whipping of the end, and enabling the operator to keep the router properly oriented relative to the cast and to make a neat controlled cut. Although many shapes are suitable for the plate 14, in the preferred illustrated embodiment it is in the form of a circular disc tapered in cross-section toward its periphery so as to facilitate sliding between a cast and the limb or body on which the cast has been formed. Since the diameter of the plate 14 need be only large enough to permit a relatively sharp turn to be made by the tool so that this router can cut a curved path having a relatively small radius if need be. The entire tool being small and compact enables it to reach into areas where space is severely limited.

As for the construction of the cutting tool proper, it should be made of such material, shape, spacing, number of teeth, and size that, when considered with the speed of rotation, it will be suitable for cutting the particular substance which it is intended to cut, the specifications being different for optimum cutting of different substances. The following data have been found excellent for the construction and operation of a bit for cutting plaster casts of the type used by physicians. A cutter shape of the general type shown in Figs. 1 and 2 is preferred. It has a generally cylindrical body and its flutes are straight. Other forms may have tapered or conical bodies and all may have helical flutes instead of straight flutes. This shape, shown in Figs. 1 and 2, affords sufficient clearance to get rid of the cuttings, and offers a form of cutting edge which is able to cut not only the plaster of Paris in the cast but also, in certain cases, the associated cotton and cheesecloth without getting twisted up in these latter and becoming useless. While a cutter with one, two, three, or more teeth can be used, it has been found that a three-tooth cutter, at the preferred diameters, is the best. A one-tooth cutter chatters, and a cutter with more than three teeth tends to make the tool choke up with cuttings. An optimum diameter for the cutting tool is of the order of ¼" or ⁵⁄₁₆" with a minimum optimum of about 5,000 R. P. M. While tools of this general type are found in various trades and professions under the names of milling cutters, burrs, routers, etc., the name router has been chosen for use in this specification as being adequately descriptive and intended to include any similar cutter called by any name whatever.

Operation

In Fig. 3 the router 2 is shown mounted in a power-driving device about to start a cut on a cast 30 mounted on a limb or body 32.

The safety disc 14 has been slid along under the cast so that it lies between the inner surface of the cast and the skin of the patient to protect the patient. The disc can be used to give more or less support to the tool to assist the operator in guiding the tool. To cut the cast, the motor is turned on and the tool is moved by means of the handle along any desired path, generally to the right in Fig. 3. It can be either pulled or pushed. The router 2 rotates cutting a slit in the cast and associated cloth and cotton, if any. The bearing 22 enables the router 2 to turn freely, while the disc 14 does not turn, thus eliminating any possibility of tearing or bruising the skin of the patient. The tool is moved along any desired path to cut the cast and, because of the compactness of the cutting portion, this path can be curved along a relatively small radius, if need be, and can lead into close quarters without impairing the ability of the tool to function. The appearance of the tool, which clearly shows the impossibility of the cutter touching the skin, serves to obviate any fear of being cut on the part of the patient.

As is well known, there is usually interposed between the skin of the patient and the plaster cast one or more layers of bandage and/or cotton padding. It is sometimes desirable to slide the safety disc 14 in the space between the plaster cast and these soft layers in order to avoid cutting these latter.

A useful modification of the tool of this invention includes the use of two counter-rotating routers, conveniently with their axis inclined toward each other to allow for clearance of the driving means at their shank ends, and with their free ends inserted in bearing relation in generally the same manner as the router 2 in Fig. 1. Such a modification would be useful to eliminate any tendency of a single router to drift to one side or another of the direction of the cut.

Obviously many other modifications and variations of the present invention are possible in the light of the above teachings. It is therefore to be understood that within the scope of the appended claims the invention may be practiced otherwise than as specifically described.

What is claimed is:

A cutting tool for a power-driven cast cutter comprising a router having a shank end and a free end; said shank end being adapted to be affixed to and driven by motor means; a safety disc mounted on, fixed to, and carried by the free end of said router in bearing relation thereto, with the diameter of the disc extending transverse to the longitudinal axis of the router and at least part of the body of said disc lying further axially remote from the shank end of said router than does the free end of said router in such a manner that the disc spaces the free end of the router from the flesh lying beneath a cast to be cut and prevents the free end of the router from touching the flesh while the disc rests on the flesh.

References Cited in the file of this patent

UNITED STATES PATENTS

| | | |
|---|---|---|
| 1,748,617 | Parker | Feb. 25, 1930 |
| 1,771,764 | Beattie | July 29, 1930 |
| 2,490,878 | Marsh | Dec. 13, 1949 |